US008065561B1

(12) United States Patent  (10) Patent No.: US 8,065,561 B1
Vaikar et al.                   (45) Date of Patent:     Nov. 22, 2011

(54) METHOD AND APPARATUS FOR AUTOMATING DEVICE RECOVERY USING DEVICE CONFIGURATION INFORMATION

(75) Inventors: Amol Manohar Vaikar, Maharashtra (IN); Adhir Prabhakar Potdar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 12/415,642

(22) Filed: Mar. 31, 2009

(51) Int. Cl.
   *G06F 11/00* (2006.01)
(52) U.S. Cl. .......................................................... 714/15
(58) Field of Classification Search .................. 714/25
   See application file for complete search history.

(56) References Cited

U.S. PATENT DOCUMENTS

| | | | |
|---|---|---|---|
| 6,230,285 B1 * | 5/2001 | Sadowsky et al. ............... 714/14 |
| 6,535,998 B1 * | 3/2003 | Cabrera et al. .................. 714/15 |
| 6,701,450 B1 * | 3/2004 | Gold et al. .................... 714/5.11 |
| 6,931,558 B1 * | 8/2005 | Jeffe et al. ....................... 713/340 |
| 7,050,859 B1 * | 5/2006 | Govindaraj et al. ............... 700/1 |
| 7,290,164 B1 * | 10/2007 | Harvey et al. ..................... 714/2 |
| 7,373,355 B2 * | 5/2008 | Hite et al. ............................. 1/1 |
| 7,640,454 B1 * | 12/2009 | Botes .............................. 714/19 |
| 7,680,957 B1 * | 3/2010 | Ketterhagen et al. ......... 709/246 |
| 7,770,057 B1 * | 8/2010 | Graham et al. ............. 714/6.12 |
| 7,865,772 B2 * | 1/2011 | Mogi et al. ...................... 714/20 |
| 7,886,190 B2 * | 2/2011 | Rothman et al. ................ 714/36 |
| 2008/0184068 A1 * | 7/2008 | Mogi et al. ...................... 714/15 |
| 2009/0222690 A1 * | 9/2009 | Seelig et al. .................... 714/15 |

OTHER PUBLICATIONS

"RAID Configuration," © 2002-2009 Geekzone®, SohoSolutions. Downloaded from web site http://www.geekzone.co.nz/content.asp?contentid=6323 on Jun. 29, 2009.
"Storage Technology News: EMC buys Indigo Stone for bare-metal restore," by SearchStorage.com Editors, May 11, 2007—SearchStorage.com. Downloaded from web site http://searchstorage.techtarget.com/news/article/0,289142,sid5_gci1254636,00.html on Jun. 29, 2009.
"WebHosting TALK®—Colocation and Data Center Discussion—Backup Software," Sep. 2005. Downloaded from web site http://www.webhostingtalk.com/archive/index.php/t-439917.html on Jun. 29, 2009.
"Backup RAID 0 Configuration ?," TechSpot OpenBoards, 2004-2005, Copyright © 1998-2009 TechSpot.com. Downloaded from web site http://www.techspot.com/vb/topic11428.html on Jun. 29, 2009.
"To restore an array configuration," Microsoft TechNet, © 2009 Microsoft Corporation. Downloaded from web site http://technet.microsoft.com/en-us/library/cc722711(printer).aspx on Jun. 29, 2009.

* cited by examiner

*Primary Examiner* — Amine Riad
(74) *Attorney, Agent, or Firm* — Campbell Stephenson LLP

(57) ABSTRACT

A method and apparatus for automating device recovery using device configuration information is described. In one embodiment, a method for restoring a configuration of a source device includes accessing device configuration information from memory associated with a plurality of devices to identify using at least one processor a configuration associated with a source device of the plurality of devices, determining using at least one processor a common configuration between the configuration associated with the source device and a configuration associated with a target device and applying, using the at least one processor, the common configuration to the target device.

20 Claims, 3 Drawing Sheets

METHOD AND APPARATUS FOR AUTOMATING DEVICE RECOVERY USING DEVICE CONFIGURATION INFORMATION

BACKGROUND

1. Field of the Invention

Embodiments of the present invention generally relate to disaster recovery systems and, more particularly, to a method and apparatus for automating device recovery using device configuration information.

2. Description of the Related Art

In a typical computing environment (e.g., a datacenter), administrators and/or users desire highly available applications and quick recovery of host computers after a disaster (e.g., power failure, hurricane and/or the like). Current disaster recovery systems (e.g., SYMANTEC NetBackUp Bare Metal Recovery (NBU-BMR)) store a backup of the host computer (e.g., a physical machine or a virtual machine). When a hardware failure or software fault occurs that disables the host computer, these current disaster recovery systems provision a bare metal server to restore operations at the host computer. Generally, the bare metal server is a computer that does not contain an operating system or any software applications. The bare-metal server may be a computer in which a virtual machine is installed directly on computer hardware rather than within the host operating system (OS).

One or more software programs (e.g., operating systems, applications and/or the like) are installed. One or more associated hardware devices (e.g., an array, a switch, a router, a firewall and/or the like) are also configured (e.g., an Internet Protocol (IP) Address for a Network Interface Card (NIC), a zone for a switch, a Logical Unit Number (LUN) of an array and/or the like). For example, the switch may be configured to assign the bare metal server to a zone that was previously assigned to the host computer. As another example, an array may be configured to provide the bare metal computer with access to one or more LUNs that were previously utilized by the host computer.

Even though the current disaster recovery systems are able to restore entire host computers, these systems are unable to recover an individual hardware device or an application that are associated with the host computer. Nonetheless, various hardware devices and/or applications must be configured to achieve optimal performance and seamless disaster recovery. For example, an array may have a specific LUN configuration, a switch may have a zoning configuration, a firewall may have a packet filtering policy and so on.

Pre-defined templates (e.g., a gold standard set by a hardware vendor) are employed to configure a particular hardware device. Such templates, however, are not customized for each and every type of computing environment (e.g., a data center). Furthermore, the configurations may change over time to accommodate changing computing resources and user needs. Although some hardware devices may have a same function, the templates used for configuration vary from vendor to vendor.

Two or more hardware devices of a same type (e.g., a switch, an array and/or the like) may perform similar functions but be provided by different vendors (i.e., manufacturers). In some instances, the two or more hardware devices from different vendors may have similar or compatible configurations. Each hardware device maintains configuration information in a proprietary format that requires vendor-specific administration software to access and/or modify. The vendor-specific administrator software migrates the configuration information between similar hardware devices (e.g., arrays or switches from a same vendor) but cannot migrate the configuration information between dissimilar hardware devices (e.g., arrays or switches from different vendors).

In other words, various parameters (e.g., a number of disks (e.g., virtual disks, hard disks), a number of storage volumes (e.g., LUNs), LUN sizes and layout, addresses of target ports (e.g., SCSI port), file system types (e.g., Windows NT File System (NTFS)), volume group ids and/or the like) associated with a source array cannot be automatically used to configure a target array from a different vender. Unfortunately, the various parameters have to be manually monitored, recorded and used to replicate/recover/rollback a configuration of the source array. Hence, restoring the configuration of the source array on the target array is a tedious and error-prone task.

Therefore, there is a need in the art for a method and apparatus for automating device recovery using device configuration information.

SUMMARY OF THE INVENTION

Embodiments of the present invention comprise a method and apparatus for automating device recovery using device configuration information. In one embodiment, a method for restoring a configuration of a source device includes accessing device configuration information from memory associated with a plurality of devices to identify using at least one processor a configuration associated with a source device of the plurality of devices, determining using at least one processor a common configuration between the configuration associated with the source device and a configuration associated with a target device and applying the common configuration using the at least one processor to the target device.

In another embodiment, an apparatus for restoring a configuration of a source device includes an integration component for facilitating communications between various agents of a plurality of agents that are executed using at least one processor to access parameter data associated with a plurality of devices and a data protection component using the at least one processor for calling the integration component to monitor the plurality of devices, aggregate the parameter data, generate device configuration information in memory, wherein the data protection component accesses the device configuration information in the memory to determine a common configuration between a configuration of a source device and a configuration of a target device using the at least one processor, wherein the data protection component utilizes the integration component to configure the target device based on the common configuration.

In yet another embodiment, a computer-readable-storage medium including one or more processor-executable instructions that, when executed by at least one processor, causes the at least one processor to access device configuration information from memory associated with a plurality of devices, identify a configuration associated with a source device of the plurality of devices, determine a common configuration between the configuration associated with the source device and a configuration associated with a target device and apply the common configuration using the at least one processor to the target device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained further below, the invention enables automatic device recovery for a plurality of hardware devices using a common configuration between a source configuration and a configuration of a target device. As soon as the common configuration is determined, a data protection component instructs an integration component to apply various compatible device configuration parameters to the target device in accordance with the common configuration as explained further below. The integration component calls an agent specific to the target device, which configures the target device using the various compatible device configuration parameters to restore operations previously associated with a source device.

Figure 1:
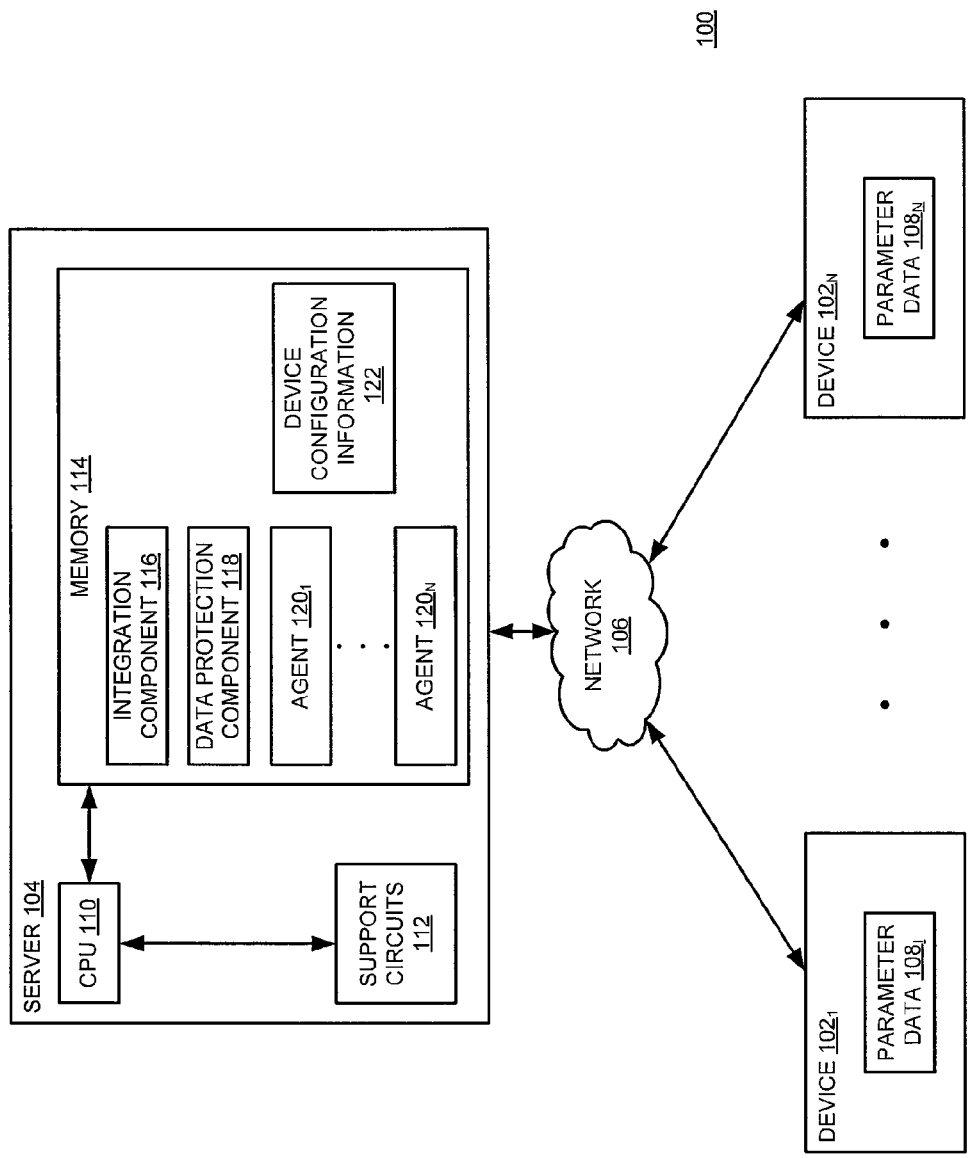
FIG. 1 is a block diagram of a system for automating device recovery using configuration information, according to various embodiments of the invention.

FIG. 1 is a block diagram of a system 100 for automating device recovery using device configuration information according to one embodiment. The system 100 may form a computing environment (e.g., a data center) that comprises a server 104, storage 106 and a plurality of devices 102, where each component is coupled one another through a network 106.

The plurality of devices 102 are illustrated as a device $102_1$, a device $102_2$, a device $102_3$ ... a device $102_N$. Each device of the plurality of devices 102 is a type of a hardware device (e.g., including but not limited to an array, a switch, a router, a firewall and/or the like) known to one of ordinary skill in the art having the benefit of this disclosure. The plurality of devices 102 facilitate various computer operations within the system 100 (e.g., data storage, disaster recovery, application/ file serving and/or the like).

Even though two or more devices of the plurality of the devices 102 may be provided by different venders, these devices may perform similar functions and utilize compatible configurations. For example, various configuration parameters (e.g., LUN size, a number of disks and/or the like) may be common to the two or more devices. As described further below, one or more common configuration parameters associated with a source device of the plurality of devices 102 may be used to configure a target device of the plurality of devices 102 in order to perform device recovery. In addition, one or more common configuration parameters associated with an application running on the source device may be used to configure the target device is order to achieve application recovery.

The server 104 is a type of computing device (e.g., a laptop, a desktop and/or the like) known to one of ordinary skill in the art having the benefit of this disclosure. The server 104 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 comprises at least one of Read Only Memory (ROM), Random Access Memory (RAM), disk drive storage, optical storage, removable storage and/or the like. The memory 114 includes various software packages, such as an integration component 116, a data protection component 118 and a plurality of agents 120 (illustrated as an agent $120_1$ ... an agent $120_N$). The agent $120_1$, the agent $120_2$, the agent $120_3$, ... the agent $120_N$ may correspond to the device $102_1$, the device $102_2$, the device $102_3$ ... a device $102_N$ respectively.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure such as Ethernet, WiFi, WiMax, General Packet Radio Service (GPRS), and the like.

The plurality of agents 120 may share various resources (e.g., data sources, application services, protocols, methods and/or the like) amongst one another. Such sharing is facilitated by execution of the integration component 116 by the CPU 110. Accordingly, the integration component 116 includes software code that is configured to facilitate communication and interaction between various agents of the plurality of the agents 120. For example, the integration component 116 includes various plug-ins (e.g., software components) that enable communication between the various agents of the plurality of agents 120. Because of the various plug-ins, the integration component 116 is able to apply one or more configuration parameters associated with a source device of the plurality of devices 102 to a target device of the plurality of devices 102.

The data protection component 118 calls the integration component 116 to select an appropriate agent amongst the plurality of agents 120 to access various configuration parameters from a particular device of the plurality of devices 102. Subsequently, the integration component 116 determines an appropriate agent to extract the parameter data 110. Once the parameter data 110 is extracted, the integration component 116 communicates the parameter data 110 to the data protection component 118. The data protection component 212, in turn stores the parameter data 110 as the device configuration information 122.

The plurality of agents 120 include various device specific agent software components that are configured to access and/ or extract the parameter data 110 from the plurality of devices 102 in order to generate the device configuration information 122. Each agent of the plurality of agents 120 may be specific to a particular device of the plurality of the devices 102. In one embodiment, the plurality of agents 120 may be executed by the CPU 110 to access and/or extract the parameter data 110 from each device of the plurality of devices 102. The plurality of agents 120 communicate the device configuration information 122 to the server 104. For example, the plurality of agents 120 may employ various protocols (e.g., a Simple Network Management Protocol (SNMP), a Small Computer System Interface (SCSI), and/or the like) to access the parameter data 110 and/or communicate the device configuration information 122.

In one embodiment, the device configuration information 122 associated with the plurality of devices 102 may include but not limited to a Logical Unit Number (LUN) configuration of an array, a zoning configuration of a switch, a packet filtering policy of a firewall and/or the like. The configuration information 122 includes various parameters for operating and managing the plurality of devices 102 (e.g., creating a LUN, assigning a LUN to a host computer, assigning an IP address to a NIC, establishing a SCSI target address for a LUN, adding the host computer to a zone and/or the like). The plurality of agents 120 access parameter data 124 that is associated with the plurality of devices 102 as described further below.

In one or more embodiments, the data protection component 118 examines the device configuration information 122 to identify a configuration of a source device (i.e., a source configuration) for device recovery. As soon as a common configuration is determined between the source device and a target device of the plurality of the devices 102, the data protection component 120 instructs the integration component 116 to apply various compatible device configuration parameters to the target device in accordance with the common configuration as explained further below. The integration component 116 calls an agent specific to the target device of the plurality of agents 120, which configures the target device using the various compatible device configuration parameters to restore operations previously associated with the source device.

According to various embodiments, the data protection component 118 includes software code that is executed by the CPU 110 to determine a common configuration between a source device of the plurality of devices 102 and a target device of the plurality of devices 102. The source device and the target device may be two similar hardware devices that perform a same function (e.g., two arrays, two switches, two routers and/or the like) and have one or more compatible device configuration parameters, such as a LUN size, a host computer name to which a LUN is assigned, a number of LUNs and/or the like for arrays.

For example, a HEWLETT-PACKARD StorageWorks XP24000 disk array and the EMC Clariion disk array may provide storage volumes to the host computer 106 but are made by different vendors. Regardless, both disk arrays may utilize a SCSI framework to provide access to one or more LUNS. Therefore, a LUN size (e.g., four (4) Gb) and/or an address for a SCSI target (e.g., c2t3d4) associated with the EMC Clariion disk array may be configured on the HP StorageWorks XP24000 disk array. As another example, the host computer 106 accesses file data for the application 118 at LUN # five (5) on the EMC Clariion disk array. Accordingly, the data protection component 118 configures the HP StorageWorks XP24000 disk array to provide the host computer 106 with access to the same file data at the LUN five.

In one embodiment, the data protection component 118 maps a configuration of the source device to a configuration of the target device to identify one or more compatible device configuration parameters between a source device of the plurality of devices 102 and a target device of the plurality of devices 102. For example, a 3COM switch and a CISCO switch operate similarly but have one or more device specific parameters that are not compatible with one another, such as port speed and Virtual LAN settings. Hence, a device specific parameter for the CISCO switch does not map to any device configuration parameter of the 3COM switch. Nonetheless, one or more device configuration parameters may be in common between the 3COM switch and the CISCO switch, such as zone network IP addresses, zone names, host computers assigned to a zone and/or the like. In fact, these common device parameters may be compatible with other switches from different vendors (e.g., a SUN StorAge switch). During a recovery of the CISCO switch, the data protection component 118 configures the 3COM switch using these common device parameters. For example, the 3COM switch is configured with zone network IP addresses, zone names and/or the like that are identical to the configuration of the CISCO switch.

The data protection component 118 calls the integration component 116 to access the parameter data 110 from the plurality of devices 102. The data protection component 118 aggregates each and every device configuration parameter from each device of the plurality of device 102 in order to generate the device configuration information 122. The data protection component 118 may utilize an interface (e.g., an Application Programming Interface (API), Command Line Interface (CLI), and/or the like) provided by the integration component 116 to request the parameter data 110 from the plurality of devices 102.

For example, the integration component 116 calls a specific agent for the HP StorageWorks XP24000 disk array of the plurality of agents 120 in order to extract a LUN size, a number of LUNs, one or more SCSI target addresses, a host computer name to which a LUN is assigned, and/or the like. These parameters are stored in the device configuration information 122 to reflect a configuration of the HP StorageWorks XP24000 disk array at a particular point-in-time. Subsequent updates to the configuration may be backed up to the device configuration information 122 on a periodic basis. As explained below, the data protection component 118 may use the configuration of the HP StorageWorks XP24000 disk array as a source configuration for device recovery.

Figure 2:
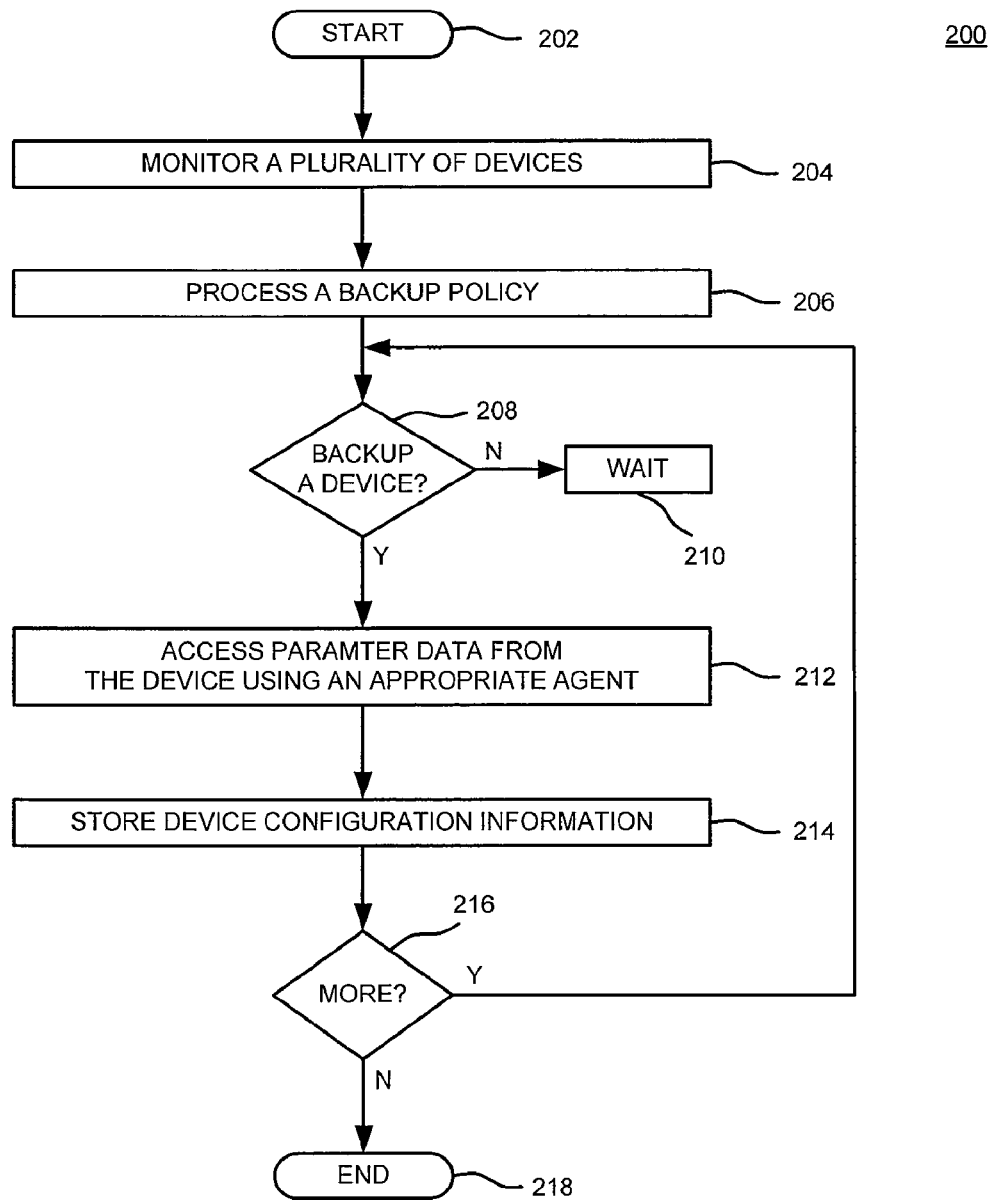
FIG. 2 is a flow diagram of a method for performing a device configuration backup on a plurality of devices, according to various embodiments of the invention.

FIG. 2 is a flow diagram of a method 200 for performing a device configuration backup on a plurality of devices according to one embodiment. The method 200 starts at step 202 and proceeds to step 204, at which a plurality of devices (e.g., the device 102 of FIG. 1) are monitored. In one embodiment, a data protection component (e.g., the data protection component 122 of FIG. 1 when recalled from memory 114 and executed by the CPU 110) monitors the plurality of devices (e.g., the plurality of devices 102 of FIG. 1). Step 202 to step 218 may be performed by the data protection component 122.

According to various embodiments, the data protection component cooperates with an integration component (e.g., the integration component 116 when recalled from memory 114 and executed by the CPU 110) to discover the plurality of devices within a computing environment (e.g., the system 100 of FIG. 1). As an example and not as a limitation, the integration component (e.g., VERITAS Enterprise Administrator (VEA)) may utilize various agents (e.g., VERITAS Array Integration Layer (VAIL), SAL, and CommandCentral (CC)) to discover similar devices from different vendors and access various device configuration parameters. In one embodiment, the data protection component (e.g., NetBackUp-Bare Metal Recovery (NBU-BMR)) backs up and maintains point-in-time consistent device configuration information (e.g., the device configuration information 122 of FIG. 1) associated with the plurality of devices.

At step 206, a backup policy is processed. In one embodiment, the data protection component processes the backup policy. At step 208, a determination is made as to whether a device is to be backed up. In one embodiment, the data protection component examines the backup policy to identify one or more devices that are to be backed up. If it is determined that the device is not to be backed up (option "NO"), then the method 200 proceeds to step 210. If the device is not included amongst the one or more identified devices, then a device configuration of the device is not to be backed up. At step 210, the method 200 waits.

If, at step 208, it is determined that the device is to be backed up (option "YES"), then the method 200 proceeds to step 212. If the device is included amongst the one or more identified devices, then the device configuration is to be backed up. At step 212, parameter data (e.g., the parameter data 124 of FIG. 1) is accessed from the device using an appropriate agent. In one embodiment, the data protection component calls an integration component to select the appropriate agent based on a device type. In some embodiments, the data protection component aggregates the parameter data in order to generate the device configuration information.

At step 214, the device configuration information (e.g., the device configuration information 122 of FIG. 1) is stored in memory (e.g., memory 114) and the method 200 proceeds to step 216. In some embodiments, the data protection component stores the device configuration information in the memory. In some embodiment, the data protection component performs regular backups of each and every device configuration parameter (e.g., the parameter data 110 of FIG. 1) associated with the plurality of devices in accordance with the backup policy. For example, a backup may be performed at a fixed pre-defined time interval or a variable time interval. Furthermore, various available protocols may be employed for the regular backups (e.g., a Simple Network Management Protocol (SNMP), a Small Computer System Interface (SCSI), and/or the like).

At step 216, a determination is made as to whether more devices are to be backed up. The data protection component examines the backup policy to determine whether there are more devices to be backed up. If it is determined that more devices are to be backed up, then the method 200 proceeds to step 208. In some embodiments, the data protection component determines that the backup policy indicates that there are more devices to be backed up and proceeds to step 216. If, at step 216, it is determined that more devices are not to be backed up, then the method 200 proceeds to step 218. In some embodiments, the backup policy indicates that there are no more devices to be backed up and the data protection component proceeds to step 218. At step 218, the method 200 ends.

Figure 3:
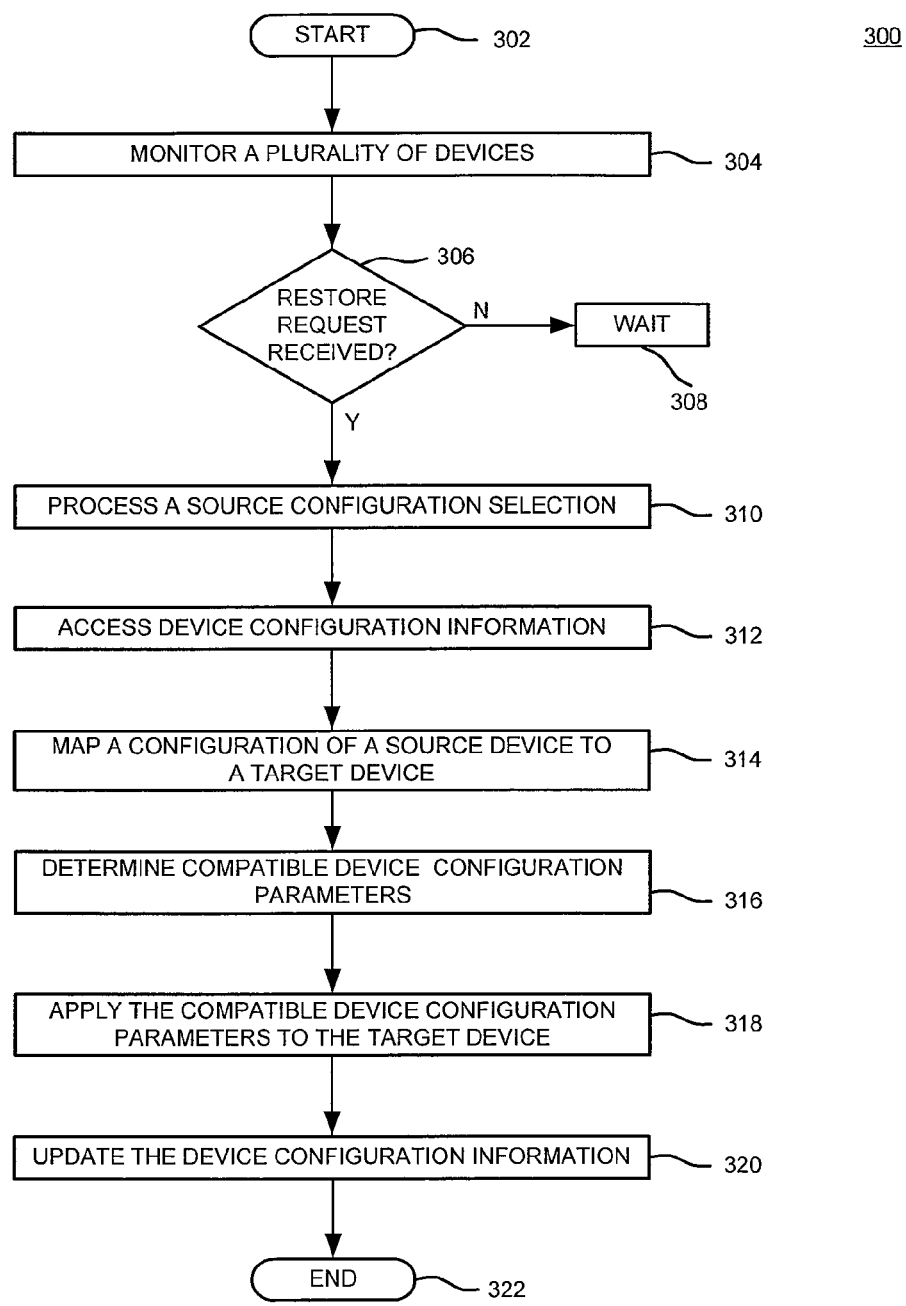
FIG. 3 is a flow diagram of a method for restoring a configuration of a source device, according to various embodiments of the invention.

FIG. 3 is a flow diagram of a method 300 for restoring a configuration of a source device according to one embodiment. The method 300 starts at step 302 and proceeds to step 304, at which a plurality of devices (e.g., the plurality of devices 102 of FIG. 1) are monitored. In some embodiments, step 302 to step 322 are performed by a data protection component. In one embodiment, a data protection component (e.g., the data protection component 122 of FIG. 1) monitors the plurality of devices (e.g., the plurality of devices 102 of FIG. 1) through a network and facilitates device recovery. At step 306, a determination is made as to whether a restore request is received. The data protection component monitors the plurality of devices for various requests, such as restore requests. If it is determined that the restore request is not received (option "NO"), then the method 300 proceeds to step 308. At step 308, the method 300 waits.

If, at step 306 it is determined that the restore request is received (option "YES"), then the method 300 proceeds to step 310. In one embodiment, an administrator/user computer communicates a restore request to the data protection component. In one embodiment, the data protection component processes a restore request that is received at a server (e.g., the server 104 of FIG. 1). At step 310, a source configuration selection is processed. The restore request indicates that the administrator/user selected a configuration of a source device for recovery. In some embodiments, the data protection component processes the source configuration selection.

At step 312, device configuration information (e.g., the device configuration information 122 of FIG. 1) is accessed. The data protection component examines the device configuration information to identify the configuration of the source device. At step 314, the configuration of the source device is mapped to a target device. In some embodiments, the data protection component maps the configuration of the source device to the target device. Results from the mapping are stored in memory (e.g., the memory 114) and may indicate a common configuration between the source device and the target device. At step 316, compatible device configuration parameters are determined. In some embodiments, the data protection component compares each and every device configuration parameter associated with the source device with each and every device configuration parameter associated with the target device to determine one or more compatible device configuration parameters, which are stored in memory (e.g., the memory 114).

At step 318, the compatible device configuration parameters are applied to the target device. In some embodiments, the data protection component retrieves the one or more compatible device configuration parameters from the memory and communicates the one or more compatible device configuration parameters to the integration component, which executes an appropriate agent to configure the target device. At step 320, the configuration information is updated. The data protection component updates the configuration information with the compatible device configuration parameters, which were used to configure the target device. The method 300 proceeds to step 322, at which the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for restoring a configuration of a source device, comprising:
accessing device configuration information stored in a memory of a computer, wherein
the device configuration information is associated with a plurality of devices,
the device configuration information is configured to identify, using at least one processor, a source configuration,
the source configuration is associated with a source device of the plurality of devices, and
the source configuration is obtained by extracting configuration parameters from the source device by executing a first agent on the computer;
determining, using the at least one processor, a common configuration, wherein
the common configuration is common to the source configuration and a target configuration, and
the target configuration is associated with a target device of the plurality of devices; and
applying, using the at least one processor, the common configuration to the target device, wherein the applying comprises
configuring the target device using the common configuration by executing a second agent on the computer.

2. The method of claim 1, wherein the determining the common configuration further comprises identifying at least one compatible device configuration parameter by mapping the source configuration to the target configuration.

3. The method of claim 1, wherein the applying further comprises configuring the target device using the at least one device configuration parameter in accordance with the common configuration, and
the configuring the target device comprises the second agent applying the common configuration to the target device.

4. The method of claim 1, wherein
the source device and the target device are provided by different vendors, and
at least one of the plurality of devices is external to the computer.

5. The method of claim 1, wherein the accessing the configuration information further comprises generating the device configuration parameters by aggregating parameter data from the plurality of devices.

6. The method of claim 1, wherein
the accessing the configuration information further comprises selecting at least one of the source device or the target device from the plurality of devices.

7. The method of claim 1, further comprising updating the configuration information by monitoring the plurality of devices.

8. An apparatus for restoring a configuration of a source device, comprising:
an integration component implemented on a computer and configured to facilitate communications between a plurality of agents, wherein
at least one of the plurality of agents is executed on the computer using at least one processor to access parameter data, and
the parameter data is associated with a plurality of devices; and
a data protection component implemented on the computer, the data protection component configured to use the at least one processor to monitor the plurality of devices by calling the integration component,
aggregate the parameter data,
generate device configuration information in memory, wherein
the device configuration information includes source configuration for a source device of the plurality of devices,
the source configuration is obtained by utilizing the integration component, and
the integration component extracts source configuration from the source device by executing a first agent on the computer,
determine a common configuration by accessing the device configuration information in the memory, wherein
the common configuration is common to the source configuration and a target configuration, and
the target configuration is associated with a target device, and
configure the target device using the common configuration by utilizing the integration component, wherein
the integration component configures the target device using the common configuration by executing a second agent on the computer.

9. The apparatus of claim 8, wherein the data protection component is configured to identify at least one compatible device configuration parameter by mapping the source configuration to the target configuration.

10. The apparatus of claim 9, wherein the data protection component configures the target device using the at least one compatible device configuration parameter in accordance with the common configuration.

11. The apparatus of claim 8, wherein
the source device and the target device are similar devices that are provided by different vendors, and
at least one of the plurality of devices is external to the computer.

12. The apparatus of claim 8, wherein the data protection component is configured to process selection of the configuration of the source device.

13. The apparatus of claim 8, wherein the data protection component is configured to update the configuration information in the memory.

14. A computer-readable-storage medium comprising one or more processor-executable instructions that, when executed by at least one processor, causes the at least one processor to:
access device configuration information from memory of a computer, wherein
the device configuration information is associated with a plurality of devices;
the device configuration information is configured to identify a source configuration associated with a source device of the plurality of devices, and
the source configuration is obtained by extracting configuration parameters from the source device by executing a first agent on the computer;
determine a common configuration, wherein
the common configuration is common to the source configuration and a target configuration, and
the target configuration is associated with a target device of the plurality of devices; and
apply the common configuration to the target device, wherein the application of the common configuration comprises configuring the target device using the common configuration by executing a second agent on the computer.

15. The computer-readable-storage medium of claim 14, further comprising one or more processor-executable instructions that, when executed by the at least one processor, causes the at least one processor to:
identify at least one compatible device configuration parameter by mapping the source configuration to the target configuration.

16. The computer-readable-storage medium of claim 14, wherein the application of the common configuration further comprises:
configuring target device using the at least one device configuration parameter in accordance with the common configuration, wherein the configuring the target device comprises the second agent applying the common configuration to the target device.

17. The computer-readable-storage medium of claim 14, wherein
the source device and the target device are provided by different vendors, and
at least one of the plurality of devices is external to the computer.

18. The computer-readable-storage medium of claim 14, further comprising one or more processor-executable instructions that, when executed by the at least one processor, causes the at least one processor to:
generate the device configuration information by aggregating parameter data from the plurality of devices.

19. The computer-readable-storage medium of claim 14, further comprising one or more processor-executable instructions that, when executed by the at least one processor, causes the at least one processor to:

select at least one of the device or the target device from the plurality of devices.

20. The computer-readable-storage medium of claim 14, further comprising one or more processor-executable instructions that, when executed by the at least one processor, causes the at least one processor to:

update the configuration information.

\* \* \* \* \*